United States Patent
Sakai et al.

(10) Patent No.: US 9,982,922 B2
(45) Date of Patent: May 29, 2018

(54) ELECTRIC COMPRESSOR

(71) Applicant: DENSO CORPORATION, Kariya, Aichi-pref. (JP)

(72) Inventors: Koji Sakai, Kariya (JP); Hiroki Ishii, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 265 days.

(21) Appl. No.: 14/654,267

(22) PCT Filed: Dec. 5, 2013

(86) PCT No.: PCT/JP2013/007138
§ 371 (c)(1),
(2) Date: Jun. 19, 2015

(87) PCT Pub. No.: WO2014/097560
PCT Pub. Date: Jun. 26, 2014

(65) Prior Publication Data
US 2015/0338143 A1 Nov. 26, 2015

(30) Foreign Application Priority Data

Dec. 20, 2012 (JP) .................................. 2012-278416

(51) Int. Cl.
*F25B 31/02* (2006.01)
*F04B 17/03* (2006.01)
(Continued)

(52) U.S. Cl.
CPC ............ *F25B 31/026* (2013.01); *F04B 17/03* (2013.01); *F04B 35/04* (2013.01);
(Continued)

(58) Field of Classification Search
CPC ........ F04B 17/03; F04B 35/04; F04B 49/065; F04B 39/0094; F25B 31/02–31/026;
(Continued)

(56) References Cited

U.S. PATENT DOCUMENTS 4,958,991 A * 9/1990 Kikuchi .............. F04C 18/0215
418/188
5,253,489 A * 10/1993 Yoshii ................. F04C 18/0215
418/15
(Continued)

FOREIGN PATENT DOCUMENTS

CN 101599682 A 12/2009
JP H01190986 A 8/1989
(Continued)

OTHER PUBLICATIONS

Office Action dated Jul. 21, 2015, issued in the corresponding JP application No. 2012-278416 with English translation.
International Search Report and Written Opinion (in Japanese with English Translation) for PCT/JP2013/007138, dated Mar. 11, 2014; ISA/JP.

*Primary Examiner* — Alexander Comley
(74) *Attorney, Agent, or Firm* — Harness, Dickey & Pierce, P.L.C.

(57) ABSTRACT

A motor unit, which drives a compressor unit, includes a stator, which generates a rotating magnetic field, and a rotor, which is rotated about a rotational axis by the rotating magnetic field at an inner side of the stator. A drive circuit unit is placed at the inner side of the stator such that a position of the drive circuit unit in a direction of the rotational axis overlaps with the stator.

8 Claims, 10 Drawing Sheets

(51) Int. Cl.
*F04B 35/04* (2006.01)
*F04B 39/00* (2006.01)
*F04C 23/00* (2006.01)
*F04C 18/02* (2006.01)
*F04C 29/00* (2006.01)
*H02K 7/14* (2006.01)
*H02M 7/00* (2006.01)
*H02K 11/33* (2016.01)

(52) U.S. Cl.
CPC ...... *F04B 39/0094* (2013.01); *F04C 18/0223* (2013.01); *F04C 23/008* (2013.01); *F04C 29/0085* (2013.01); *F04C 2240/808* (2013.01); *F25B 31/023* (2013.01); *H02K 7/14* (2013.01); *H02K 11/33* (2016.01); *H02M 7/003* (2013.01)

(58) Field of Classification Search
CPC ..... F04C 29/047; F04C 18/02–18/0215; F04C 18/0223; F04C 2240/808; F04C 23/008; F04C 2240/403
USPC .......... 417/410.1, 410.3–410.5, 250
See application file for complete search history.

(56) References Cited

U.S. PATENT DOCUMENTS

| | | | |
|---|---|---|---|
| 6,321,563 | B1 | 11/2001 | Ikeda et al. |
| 2002/0025265 | A1* | 2/2002 | Ikeda ................. F04B 39/06 417/410.1 |
| 2010/0064707 | A1* | 3/2010 | Sato .................. F04C 18/0215 62/176.3 |
| 2011/0268593 | A1* | 11/2011 | Yamada ............. F04B 35/04 417/410.1 |

FOREIGN PATENT DOCUMENTS

| | | |
|---|---|---|
| JP | H04148088 A | 5/1992 |
| JP | 2000291557 A | 10/2000 |
| JP | 2002070743 A | 3/2002 |
| JP | 2009225618 A | 10/2009 |
| JP | 2009296687 A | 12/2009 |
| JP | 2012127328 A | 7/2012 |
| JP | 2012191772 A | 10/2012 |
| WO | WO-2009084245 A1 | 7/2009 |

\* cited by examiner

ELECTRIC COMPRESSOR

CROSS REFERENCE TO RELATED APPLICATIONS

This application is a U.S. National Phase Application under 35 U.S.C. 371 of International Application No. PCT/JP2013/007138 filed on Dec. 5, 2013 and published in Japanese as WO 2014/097560 A1 on Jun. 26, 2014. This application is based on and claims the benefit of priority from Japanese Patent Application No. 2012-278416 filed on Dec. 20, 2012. The entire disclosures of all of the above applications are incorporated herein by reference.

TECHNICAL FIELD

The present disclosure relates to an electric compressor that includes a compressor unit, which compresses refrigerant, an electric motor, which drives the compressor unit, and a drive circuit unit, which drives the electric motor.

BACKGROUND ART

As a prior art technique, there exists a compressor disclosed in, for example, Patent Literature 1. This compressor includes a compression mechanism, which draws and compresses refrigerant, an electric motor unit, which drives the compression mechanism, and a control circuit board, which drives the electric motor unit. The compression mechanism, the electric motor unit and the control circuit board are arranged in this order in the direction of the rotational axis of the electric motor unit.

CITATION LIST

Patent Literature

Patent Literature 1: JP2012-127328A.

SUMMARY OF INVENTION

However, in the compressor of the above prior art technique, a drive circuit unit, which includes the control circuit board, is placed at the outer side of the axial end part of the electric motor unit on the side of the electric motor unit that is opposite from the compression mechanism. Therefore, it is difficult to reduce a size of the compressor. With respect to this disadvantage, the inventors of the present application have found that the size of the electric compressor can be reduced when a positional relationship of the electric motor unit and the drive circuit unit is improved.

The present disclosure is made in view of the above point. Thus, it is an objective of the present disclosure to provide an electric compressor that enables a reduction in a size of the electric compressor.

In order to achieve the above objective, according to the present disclosure, there is provided an electric compressor that includes a compressor unit, an electric motor, and a drive circuit unit. The compressor unit draws and compresses refrigerant. The electric motor drives the compressor unit. The drive circuit unit drives the electric motor. The electric motor includes a stator, which generates a rotating magnetic field, and a rotor, which is rotated about a rotational axis by the rotating magnetic field at an inner side of the stator. The drive circuit unit is placed at the inner side of the stator such that a position of the drive circuit unit in a direction of the rotational axis overlaps with the stator.

In this way, the drive circuit unit can be placed at the inner side of the stator. As a result, a size of the electric compressor in the direction of the rotational axis can be reduced in comparison to the case where the drive circuit unit is placed at the outer side of the axial end part of the electric motor unit. In this way, the size of the electric compressor can be reduced.

Furthermore, according to the present disclosure, the electric motor includes a rotatable shaft portion, to which the rotor is fixed, and the rotatable shaft portion rotates about the rotational axis. The compressor unit is engaged with one of two end sides of the rotatable shaft portion, which are placed along the direction of the rotational axis on two opposite sides, respectively, of a fixing part of the rotatable shaft portion where the rotor is fixed to the rotatable shaft portion, and only the one of the two end sides of the rotatable shaft portion is rotatably supported.

In this way, the rotatable shaft portion, which is rotated together with the rotor, is supported only at the one end side of the rotatable shaft portion where the compressor unit is placed, and there is no need to provide a bearing structure that rotatably supports the other end side of the rotatable shaft portion. Thus, an extra space, which is left by eliminating a need for this bearing structure, can be used to easily place the drive circuit unit at the inner side of the stator of the electric motor. In this way, the size of the electric compressor can be reliably reduced.

DESCRIPTION OF EMBODIMENTS

Figure 1:
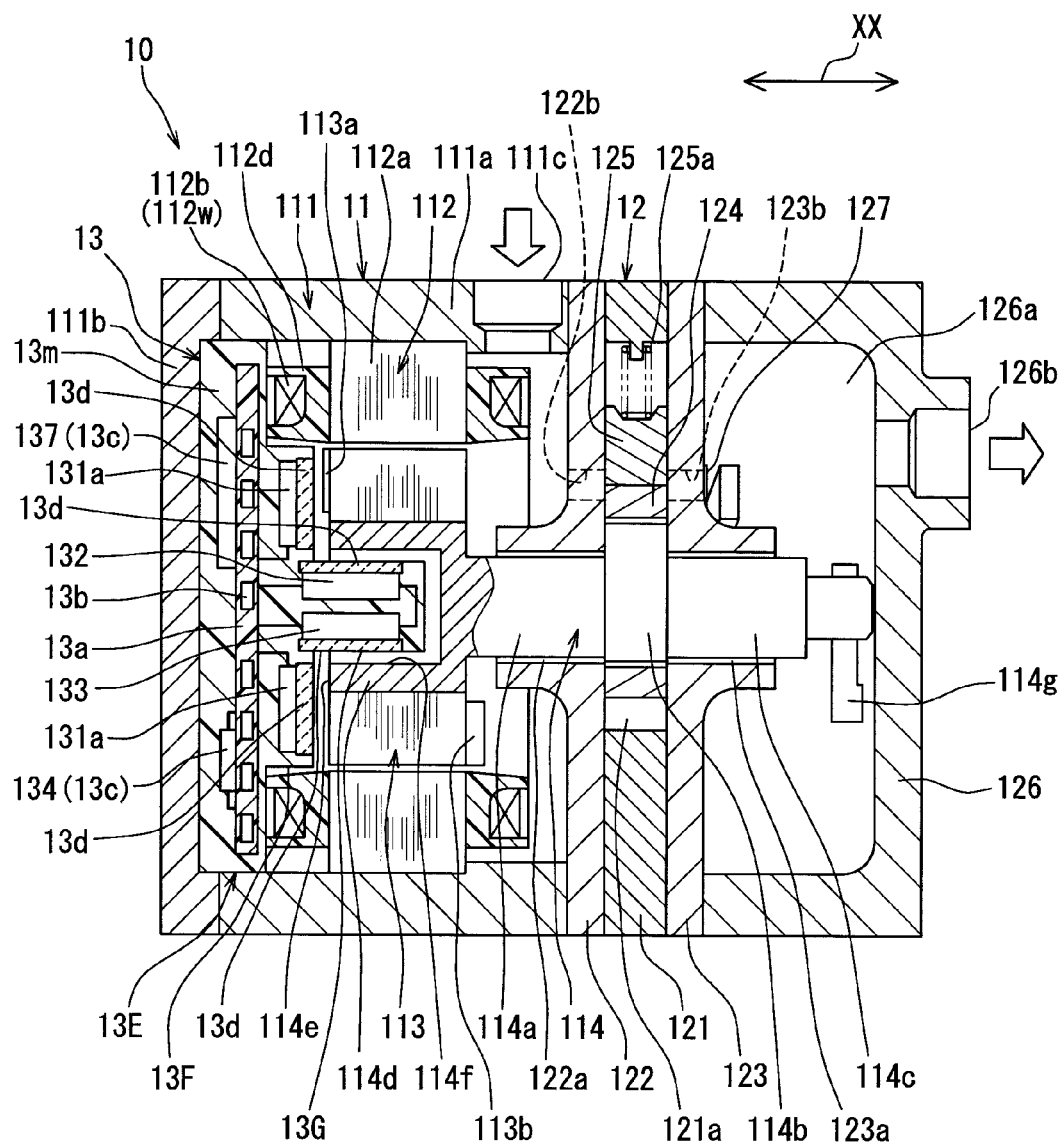
FIG. 1 is a cross-sectional view showing a schematic structure of an electric compressor according to a first embodiment of the present disclosure.

Various embodiments of the present disclosure will be described with reference to the accompanying drawings. In the following respective embodiments, portions, which are described in a previous embodiment(s), will be indicated by the same reference numerals and will not be redundantly described in some cases. In each of the following embodiments, if only a part of a structure is described, the remaining part is the same as that of the previously described embodiment(s). Besides specific combinations of portions described in the following respective embodiments, portions of some of the embodiments may be partially combined together as long as such a combination does not cause a problem.

First Embodiment

A first embodiment of the present disclosure will be described with reference to FIGS. 1 and 2.

As shown in FIG. 1, an electric compressor 10 of the present embodiment includes an electric motor unit 11 (serving as an electric motor), a compressor unit 12, which is driven by the electric motor unit 11, and a drive circuit unit 13, which drives the electric motor unit 11. The electric motor unit (hereinafter referred to as a motor unit) 11 includes a motor housing 111, a stator 112 and a rotor 113.

The motor housing 111 is made of, for example, metal and includes a cylindrical tubular portion 111a, and an end housing 111b. The end housing 111b is arranged to close a left end of the cylindrical tubular portion 111a in the drawing.

The stator 112, which is a stationary part, is arranged along an inner peripheral surface of the cylindrical tubular portion 111a in the motor housing 111. The stator 112 includes a core 112a, a plurality of coils 112b and a bobbin 112d (known as an insulator) 112d. The core 112a is fixed to the inner peripheral surface of the cylindrical tubular portion 111a. In the present embodiment, the coils 112b include three coils (a U-phase coil, a V-phase coil, and a W-phase coil) and are wound around the core 112a. The bobbin 112d is made of a dielectric material of, for example, resin and is interposed between the core 112a and the coils 112b.

Each coil 112b is formed by an electrically conductive wire 112w, which is covered with a dielectric cover. Each coil 112b is wound around the bobbin 112d made of, for example, the resin and is installed to the core 112a together with the bobbin 112d. Specifically, the coils 112b, each of which is formed by the electrically conductive wire 112w, are wound around the core 112a made of, for example, a soft magnetic material through the bobbin 112d made of the dielectric material.

The rotor 113 is placed at an inner side of the stator 112. The rotor 113 is rotated by a rotating magnetic field that is generated when the coils 112b of the stator 112 are energized. The rotor 113 includes, for example, permanent magnets. A rotatable shaft portion 114a of a crankshaft 114 extends through a center of the rotor 113, and the rotor 113 is fixed to an outer peripheral surface of the rotatable shaft portion 114a.

The drive circuit unit 13 is placed in the motor housing 111. Details of the drive circuit unit 13 will be described later.

The compressor unit 12 is placed on a right side of the motor unit 11 in the drawing. The compressor unit 12 is made of metal, such as iron or an aluminum alloy and includes a cylinder plate 121, support plates 122, 123, a rotor 124, and a vane 125.

The cylinder plate 121 is an annular plate member and is held between the pair of support plates 122, 123. An inside space is formed as a cylinder chamber by a structure formed by stacking the cylinder plate 121 and the support plates 122, 123. The rotor 124, which is an annular piston, is placed eccentric to the cylinder plate 121 in the cylinder chamber.

A space, which is formed between an inner peripheral surface of the cylinder plate 121 and an outer peripheral surface of the rotor 124, forms a compression chamber 121a for compressing refrigerant. The vane 125 is provided to the cylinder plate 121. The vane 125 projects inward in a radial direction from the inner peripheral surface of the cylinder plate 121 and is displaceable in the radial direction. The vane 125 is always urged inward by a spring 125a, which is an urging member. In this way, a distal end of the vane 125 is always in slide contact with the outer peripheral surface of the rotor 124. The vane 125 is a partitioning member that partitions the compression chamber 121a into a high pressure side and a low pressure side.

The compressor unit 12 of the present embodiment forms a compression mechanism of a rotary type, which rotates the eccentric rotor. However, the compressor unit of the present disclosure is not limited to this type. The compressor unit may be, for example, a rotational compression mechanism of a scroll type. Furthermore, the compressor unit may be, for example, a compression mechanism of a reciprocating type.

The crankshaft 114 is a rotation output shaft of the motor unit 11 and includes the rotatable shaft portion 114a, a crank portion 114b and a rotatable shaft portion 114c, which are formed integrally. Each of the rotatable shaft portions 114a, 114c is a shaft portion that is rotated about a rotational axis of the rotatable shaft portions 114a, 114c, which serves as a rotational center. The crank portion 114b, which is placed on a right side of the rotatable shaft portion 114a in the drawing, is an eccentric portion that is eccentric relative to the rotational axis of the rotatable shaft portions 114a, 114c.

The rotatable shaft portion 114a forms an enlarged diameter part 114d, which is a left side portion in the drawing and has an outer diameter that is larger than the rest of the rotatable shaft portion 114a. The rotor 113 is fixed to an outer peripheral surface of the enlarged diameter part 114d. Among two end sides of the rotatable shaft portion 114a in a direction of the rotational axis of the rotatable shaft portion 114a (an XX direction in the drawing, and hereinafter the direction of the rotational axis of the rotatable shaft portion 114a may be also referred to as the XX direction), only the right end side (a crank portion 114b side) of the rotatable shaft portion 114a is rotatably supported.

The support plate 122 includes an annular plate portion and a cylindrical portion. The annular plate portion of the support plate 122 extends in a direction that is perpendicular to the XX direction, and the cylindrical portion of the support plate 122 projects from an inner peripheral edge of the annular plate portion toward the left side in the drawing. A bearing portion 122a is provided to an inner peripheral surface of the cylindrical tubular portion of the support plate 122 to rotatably support the one end part of the rotatable shaft portion 114a.

A recess 114f is formed in the rotatable shaft portion 114a such that the recess 114f is recessed from an end surface 114e of the rotatable shaft portion 114a at the other end side toward the right side in the drawing. In other words, the recess 114f, which forms a cylindrical space that extends in the XX direction from the end surface 114e located at the left side in the drawing, is formed in the enlarged diameter part 114d of the rotatable shaft portion 114a.

The crank portion 114b is placed at the inner side of the rotor 124 of the compressor unit 12. When the crankshaft 114 is rotated, the rotor 124 revolves (making revolution movement) due to the action of the crank portion 114b.

The rotatable shaft portion 114c is provided on the right side of the crank portion 114b (i.e., the side of the crank portion 114b, which is opposite from the rotatable shaft portion 114a). The rotatable shaft portion 114c is rotatably supported by the support plate 123.

The support plate 123 includes an annular plate portion and a cylindrical portion. The annular plate portion of the support plate 123 extends in the direction that is perpendicular to the XX direction, and the cylindrical portion of the support plate 123 projects from an inner peripheral edge of the annular plate portion of the support plate 123 toward the right side in the drawing. A bearing portion 123a is provided to an inner peripheral surface of the cylindrical tubular portion of the support plate 123 to rotatably support the rotatable shaft portion 114c.

A front housing 126 is placed at the right side of the compressor unit 12 in the drawing. The front housing 126 is configured into a relatively shallow cylindrical tubular form having a bottom. An inside space of the front housing 126 (a space formed by the support plate 123 and the front housing 126) serves as a discharge chamber 126a.

A suction port 111c is formed in an upper part of the cylindrical tubular portion 111a of the motor housing 111 such that the suction port 111c extends through the cylindrical tubular portion 111a in the radial direction. The suction port 111c is a port that guides the low temperature and low pressure refrigerant from an undepicted connecting refrigerant conduit into the inside of the motor housing 111.

A suction hole 122b is formed in the support plate 122 to draw the low pressure refrigerant from the inside of the motor housing 111 to the compression chamber 121a. A discharge hole 123b is formed in the support plate 123 to discharge the high temperature and high pressure refrigerant, which is compressed in the compression chamber 121a, to the discharge chamber 126a.

A discharge valve 127 is placed in the discharge chamber 126a. The discharge valve 127 is opened to open the discharge hole 123b when the pressure of the compression chamber 121a reaches a predetermined pressure. The discharge valve 127 includes a reed valve and a retainer. The retainer limits excessive displacement of the reed valve and holds the reed valve.

A discharge port 126b is formed in the front housing 126 to extend through a bottom portion (a right side wall portion in the drawing) of the front housing 126 in the XX direction. The discharge port 126b is a port that guides the high temperature and high pressure refrigerant of the discharge chamber 126a to, for example, an undepicted connecting refrigerant conduit.

A right end part of the rotatable shaft portion 114c, which is located at the right side in the drawing, projects into the inside of the discharge chamber 126a. A balancer 114g is provided to a projecting end part of the rotatable shaft portion 114c. The balancer 114g is provided to adjust the rotational balance of the rotatable body of the electric compressor 10 in cooperation with balancers 113a, 113b installed to the rotor 113. Here, the rotatable body referrers to a structure that includes the rotor 113, the crankshaft 114 and the rotor 124 of the compressor unit 12.

An operation of the electric compressor 10 having the above-described structure will be briefly described. First of all, when an electric power source to the drive circuit unit 13 is turned on, a three-phase drive electric current is supplied to the coils (the U-phase coil, the V-phase coil and the W-phase coil) 112b of the motor unit 11. In response to this, a rotating magnetic field is generated from the core 112a, so that a rotational force is exerted to the rotor 113. Thereby, the rotor 113 is rotated together with the crankshaft 114. Thus, the compressor unit 12 is rotated by the rotational drive force conducted from the crankshaft 114 to draw the refrigerant.

At this time, the refrigerant, which is drawn from an evaporator side, flows from the suction port 111c to the inside of the motor housing 111. The drawn refrigerant flows in the inside of the motor housing 111 and is supplied to the compression chamber 121a through the suction hole 122b. The drawn refrigerant is compressed in the compression chamber 121a and outflows from the compression chamber 121a to the discharge chamber 126a through the discharge hole 123b. This discharged refrigerant is discharged toward the radiator side through the discharge port 126b.

The drive circuit unit 13 generates heat in response to the operation of the drive circuit unit 13. The energy, which is generated from the drive circuit unit 13, is conducted to the refrigerant that flows in the inside of the motor housing 111. Thereby, the drive circuit unit 13 is cooled by the drawn refrigerant.

At this time, the coils 112b also generate the heat in response to the energization of the coils 112b with the three-phase drive electric current. The heat, which is generated from the coils 112b, is conducted directly to the refrigerant flowing in the inside of the motor housing 111 or is conducted indirectly to the refrigerant flowing in the inside of the motor housing 111 through the core 112a. In this way, the core 112a and the coils 112b can be cooled with the drawn refrigerant.

Next, a structure of the drive circuit unit 13 will be described in detail. The drive circuit unit 13 is placed at the left side in the inside of the motor housing 111 in the drawing (the side of the motor unit 11, which is opposite from the compressor unit). As shown in FIG. 2, the drive circuit unit 13 (a drive device that is known as an inverter device) includes an inverter circuit 131 and drives the motor unit 11 through an operation of the inverter circuit 131.

The electric compressor 10 is a compressor that is placed in a heat pump cycle of a vehicle air conditioning system that uses, for example, carbon dioxide as the refrigerant. In the electric compressor 10, the compressor unit 12, which serves as a load, is driven by the motor unit 11, which is formed as a synchronous motor. The electric compressor 10 is an electric compressor that compresses gas-phase refrigerant and discharges the compressed refrigerant (in the case of the carbon dioxide refrigerant, the electric compressor 10 compresses the carbon dioxide refrigerant to a pressure that is equal to or larger than a critical pressure of the carbon dioxide refrigerant). The motor unit 11 of the present embodiment is the synchronous motor that includes four magnetic poles and the three-phase coils and drives the rotor 113, in which the magnets are embedded.

Figure 2:
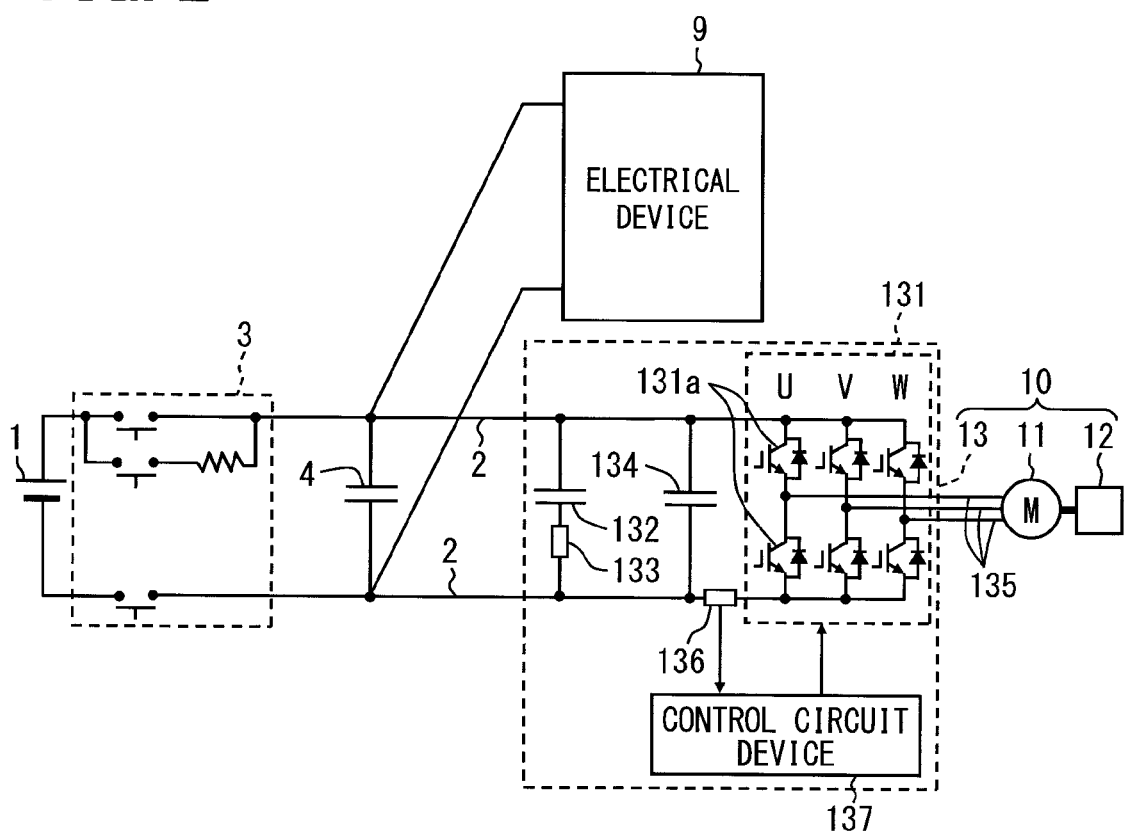
FIG. 2 is a circuit diagram showing a schematic circuit structure of the electric compressor of the first embodiment along with a system, in which the electric compressor is provided.

A direct-current power source 1 shown in FIG. 2 is a supply source that supplies a direct-current voltage and includes a high voltage battery that can output a voltage of, for example, 288 V. A high voltage relay system 3 is provided at a pair of bus lines 2, which extend from the direct-current power source 1 to the inverter circuit 131. The high voltage relay system 3 includes a plurality of relays and a resistor. At the time of applying the high voltage, the high voltage relay system 3 starts application of the voltage through an electric path having the resistor and changes the electric path having the resistor to an electric path having no resistor after the starting of the application of the voltage, so that the high voltage relay system 3 has a function of limiting flow of an inrush current in the bus lines 2.

Furthermore, in a case where an abnormality state of, for example, the electric compressor 10 is sensed, the high voltage relay system 3 disconnects the power supply electric path.

As shown in FIG. 2, a smoothing capacitor 4, which serves as a smoothing means, is interposed between the pair of the bus lines 2 that form the electric power supply path for conducting the electric power from the direct-current power source 1 to the inverter circuit 131. The smoothing capacitor 4 is provided to smooth the voltage, which fluctuates due to an influence of an electrical device (another device) 9 that is connected to the bus lines 2 in parallel with the inverter circuit 131. Here, the electrical device 9 may be, for example, a vehicle drive electric motor drive device, an electric charger, or a step-down DC/DC converter.

For example, in a case where a plurality of electric motor drive devices is installed in a vehicle, and the electrical device 9 is a vehicle driving electric motor drive device, the electrical device 9 is a main drive device among the electric motor drive devices that are powered from the direct-current power source 1. Furthermore, the drive circuit unit 13, which includes the inverter circuit 131, is a secondary drive device. Here, the main drive device is, for example, a device that receives a larger input electric power from the direct-current power source 1 in comparison to the secondary drive device. Furthermore, in some cases, the main drive device may be a device that is given the first priority for receiving the electric power in a case where the electric power supply to both of the main drive device and the secondary drive device is difficult.

In a case where the input electric power to the electrical device 9 is larger than the input electric power to the electric compressor 10 by, for example, a predetermined number of times where the predetermined number has more than one digit (i.e., the input electric power to the electrical device 9 is at least ten times larger than the input electric power to the electric compressor 10), a change in the voltage applied from the direct-current power source 1 to the inverter circuit 131 through the bus lines 2 tends to be large. The smoothing capacitor 4 is provided to limit this voltage change.

Capacitors 132, 134 and a resistor 133, which form a part of the drive circuit unit 13, are interposed between the pair of bus lines 2. The capacitors 132, 134 are provided to absorb surge and ripple generated in response to a switching operation of switching devices 131a of the inverter circuit 131.

The capacitor 134 is a capacitor that can absorb high frequency noises. In contrast to the capacitor 134, the resistor 133 is placed in series with the capacitor 132 to enable absorption of noises having low frequencies. The structure of the smoothing functional portion of the drive circuit unit 13 is not limited to the structure, which includes the capacitors 132, 134 and the resistor 133. For example, a capacitor, which has the smoothing function, may be added in parallel with the capacitors 132, 134.

The inverter circuit 131 has three-phase arms, i.e., a U-phase arm, a V-phase arm and a W-phase arm, which correspond to the stator coils (the coils 112b of FIG. 1) of the motor unit 11, and the inverter circuit 131 converts the direct current voltage, which is supplied through the bus lines 2, into alternating current through PWM modulation, and the inverter circuit 131 outputs the alternating current.

The U-phase arm includes an upper arm and a lower arm, which are connected in series and are depicted at the upper side and the lower side, respectively, in the drawing. The upper arm of the U-phase arm includes the corresponding switching device 131a and a free wheeling diode, which are connected in parallel but with their polarities reversed. The lower arm of the U-phase arm includes the corresponding switching device 131a and a free wheeling diode, which are connected in parallel but with their polarities reversed. An output line 135, which extends from a connection between the upper arm and the lower arm, is connected to the corresponding coil (specifically the U-phase coil) 112b. Each of the V-phase arm and the W-phase arm formed by the switching devices and the diodes in a manner similar to that of the U-phase arm discussed above, and the output line 135, which extends from the connection between the upper arm and the lower arm in each of the V-phase arm and the W-phase arm, is connected to the corresponding coil (specifically the corresponding one of the V-phase coil and the W-phase coil) 112b.

A device, such as IGBT (Insulated Gate Bipolar Transistor) may be used as the switching device 131a. Furthermore, a switching device, such as RCIGBT (Reverse Conducting Insulated Gate Bipolar Transistor) that is a power semiconductor, in which the IGBT and the free wheeling diode are integrated into one chip, may be used as the arm, which is formed by the switching device and the diode.

The control circuit device 137, which serves as a control means, includes a microcomputer, a current sensing functional portion, and a driving driver portion. The microcomputer forms an arithmetic processing portion. The control circuit device 137 controls the switching operation of each switching device 131a of the inverter circuit 131 to control the driving operation of the motor unit 11. The control circuit device 137 receives motor coil current value information, which is measured with a current sensing device 136 that is installed to the bus line 2. The control circuit device 137 executes various control computations based on the received motor coil current value information to generate a notch wave, and the control circuit device 137 outputs the generated notch wave to the inverter circuit 131.

The drive circuit unit 13 shown in FIG. 1 is constructed by forming the drive circuit unit 13 having the structure shown in FIG. 2 at a surface and an inside of a circuit board 13a. The circuit board 13a is a multilayer circuit board (e.g., a four layer circuit board), which is formed by stacking and integrating a plurality of dielectric material layers, and a conductor pattern is formed at the surface of the circuit board and the inside of the circuit board 13a. The circuit board 13a includes embedded devices 13b and surface mount devices 113c, which are electrically connected to the corresponding conductor pattern.

As shown in FIG. 1, the capacitor 134, which is the surface mount device 13c, and the devices, which form the control circuit device 137, are provided to a left side surface of the control circuit board 13a in the drawing. Furthermore, the switching devices 131a, the capacitor 132, and the resistor 133, each of which is electrically connected to the corresponding conductor pattern through a corresponding lead(s), are provided to a right side surface of the control circuit board 13a. Here, it should be noted that surface mount devices, which are not shown in the drawing for the sake of simplicity, are arranged around lead connecting portions of the circuit board 13a.

Each switching device 131a is arranged such that a device main body, which is configured into a planar plate form, of the switching device 131a extends in parallel with the circuit board 13a. A dielectric heat releasing plate 13d is installed to a back surface (a right surface in the drawing, i.e., a surface opposite from the circuit board 13a) of the switching device 131a. The dielectric heat releasing plate 13d is made of a ceramic material, such as aluminum nitride or alumina.

Each of the capacitor 132 and the resistor 133 is arranged such that a thickness direction of a device main body of the capacitor 132 or the resistor 133 coincides with the radial direction of the motor unit 11 (the direction that is perpendicular to the XX direction). Dielectric heat releasing plates 13d are respectively installed to an upper surface of the capacitor 132 and a lower surface of the resistor 133 in the drawing (i.e., radially outer side surfaces of the capacitor 132 and of the resistor 133, which are located on the radially outer side in the radial direction of the motor unit 11). It is desirable that the capacitor 132 and the resistor 133 are arranged such that a longitudinal direction of the capacitor 132 and a longitudinal direction of the resistor 133 coincide with the XX direction.

The drive circuit unit 13, which includes the circuit board 13a having the respective devices installed to the circuit board 13a, has a protective member 13m (serving as a protective material layer) that is formed to cover an entire surface area of the drive circuit unit 13. The protective member 13m is made of, for example, epoxy resin and is formed by resin molding (e.g., insert molding) the circuit board 13a, to which the devices are installed.

The protective member 13m isolates and protects the electric circuit of the drive circuit unit 13 from the refrigerant. Therefore, an opposite surface of the dielectric heat releasing plate 13d, which is opposite from the corresponding device, can be exposed from the protective member 13m.

An entire shape (outer shape) of the drive circuit unit 13, which has the protective member 13m formed at the surface of the drive circuit unit 13, is configured into a stepped cylindrical form, and the drive circuit unit 13 includes a main body portion 13E, a first projecting portion 13F, and a second projecting portion 13G. The main body portion 13E, which is located at the left side in the drawing, receives the circuit board 13a in an inside of the main body portion 13E, and the main body portion 13E extends in the direction that is perpendicular to the XX direction. A portion of the main body portion 13E is placed in an inside of a recess of the end housing 111b, and the rest of the main body portion 13E is placed in an inside of the cylindrical tubular portion 111a.

The first projecting portion 13F, which projects in the XX direction from a center part of the main body portion 13E at a right side surface of the main body portion 13E in the drawing, receives the switching devices 131a in an inside of the first projecting portion 13F. Furthermore, the second projecting portion 13G, which further projects in the XX direction from a center part of a distal end surface of the first projecting portion 13F, receives the capacitor 132 and the resistor 133 in an inside of the second projecting portion 13G.

The main body portion 13E is placed at the left end side of the motor housing 111 in the drawing. The stator 112 (specifically, an end surface of the bobbin 112d) contacts an outer peripheral edge part of the main body portion 13E at a right side surface of the main body portion 13E in the drawing.

The first projecting portion 13F and the second projecting portion 13G are placed at the inner side of the stator 112. Specifically, the first projecting portion 13F and the second projecting portion 13G are arranged such that a position of the first projecting portion 13F and a position of the second projecting portion 13G overlap with the stator 112 in the XX direction. A right side surface of the first projecting portion 13F and a left side surface of the rotor 113 are opposed to each other and are spaced from each other in the drawing.

Furthermore, the second projecting portion 13G is placed in the inside of the recess 114f of the rotatable shaft portion 114a. The second projecting portion 13G is placed such that the second projecting portion 13G does not interfere with the rotor 113 and the crankshaft 114.

The switching devices 131a, the capacitor 132 and the resistor 133 are heat generating devices, each of which generates a relatively large amount of heat. These heat generating devices are arranged in the first projecting portion 13F and the second projecting portion 13G. Furthermore, the capacitor 132 and the resistor 133 are heat generating devices, each of which has a relative large size. The capacitor 132 and the resistor 133, which are large components that generate the heat, are placed in the second projecting portion 13G.

According to the above-described structure and operation, the motor unit 11, which drives the compressor unit 12, includes the stator 112, which generates the rotating magnetic field, and the rotor 113, which is rotated about the rotational axis of the rotor 113 at the inner side of the stator 112 by the rotating magnetic field. The drive circuit unit 13 is placed at the inner side of the stator 112 such that the position of the drive circuit unit 13 overlaps with the position of the stator 112 in the direction of the rotational axis (the XX direction). In other words, a portion of the drive circuit unit 13 (specifically the first projecting portion 13F and the second projecting portion 13G) is placed at the inner side of the stator 112 in the radial direction such that the range of the drive circuit unit 13 in the direction of the rotational axis and the range of the stator 112 in the direction of the rotational axis partially overlap with each other.

In this way, the drive circuit unit 13 can be placed at the inner side of the stator 112 of the motor unit 11. As a result, a size of the electric compressor 10 in the direction of the rotational axis (the XX direction) can be reduced in comparison to the case where the drive circuit unit is placed only at the outer side of the axial end part of the motor unit. Accordingly, the size of the electric compressor 10 can be reduced.

Furthermore, the motor unit 11 includes the rotatable shaft portion 114a, which is fixed to the rotor 113 and is rotated about the rotational axis. The compressor unit 12 is engaged with one (the right side in FIG. 1) of two end sides of the rotatable shaft portion 114a, which are placed along the direction of the rotational axis on two opposite sides, respectively, of a fixing part of the rotatable shaft portion 114a where the rotor 113 is fixed to the rotatable shaft portion 114a, and only the one of the two end sides of the rotatable shaft portion 114a is rotatably supported. The drive circuit unit 13 is placed at the other end side (the left side in the drawing) of the rotatable shaft portion 114a.

In this way, the rotatable shaft portion 114a, which is rotated together with the rotor 113, is rotatably supported only at the one end side where the compressor unit 12 is placed, and there is no bearing structure, which rotatably supports the other end side of the rotatable shaft portion 114a. Thus, an extra space, which is left by eliminating a need for this bearing structure, can be effectively used to easily place the drive circuit unit 13 at the inner side of the stator 112 of the motor unit 11. In this way, the size of the electric compressor 10 can be reliably reduced.

Furthermore, the rotatable shaft portion 114a has the recess 114f, which is recessed from the end surface 114e at the other end side, and the portion of the drive circuit unit 13 (specifically the second projecting portion 13G) is placed in the recess 114f. In this way, the recess 114f of the rotatable shaft portion 114a can be used to place the drive circuit unit 13 at the inner side of the stator 112. Thereby, the size of the electric compressor 10 can be further reliably reduced.

As discussed above, the drive circuit unit 13 is placed in the space in the inside of the motor unit 11 and the portion that is not functionally required, so that the size of the electric compressor 10 can be substantially reduced.

Furthermore, in a view taken in the XX direction, the drive circuit unit 13 is entirely placed at the inner side of the outer peripheral part of the stator 112. Thereby, it is possible to limit an increase in the radial size of the electric compressor 10.

Furthermore, the motor unit 11 receives the stator 112 and the rotor 113 in the inside of the motor unit 11 and has the motor housing 111, through which the refrigerant to be drawn by the compressor unit 12 flows, and the drive circuit unit 13 is placed in the inside of the motor housing 111. The protective member 13m, which isolates and protects the electric circuit of the drive circuit unit 13 from the refrigerant, is formed at the surface of the drive circuit unit 13.

Thereby, the drive circuit unit 13 can be cooled with the refrigerant to be drawn by the compressor unit 12, and the electric circuit of the drive circuit unit 13 can be protected from the refrigerant that flows in the inside of the motor housing 111. Furthermore, the protective member 13m can also protect the electric circuit of the drive circuit unit 13 from refrigerating machine oil that flows along with the refrigerant.

Since the drive circuit unit 13 has the protective material layer, which protects the electric circuit from the refrigerant and the refrigerating machine oil, it is possible to place the drive circuit unit 13 in the inside of the motor housing 111, through which the drawn refrigerant flows. In this way, the placement of the drive circuit unit 13 at the inner side of the stator 112 is eased.

Furthermore, the switching devices 131a, the capacitor 132 and the resistor 133 are installed to the right side surface of the circuit board 13a in FIG. 1 and are placed in the first and second projecting portions 13F, 13G. In this way, the switching devices 131a, the capacitor 132 and the resistor 133, which are the heat generating devices, can be easily cooled with the drawn refrigerant.

Furthermore, the capacitor 132 and the resistor 133, which are the relatively large components among the heat generating devices, are placed in the second projecting portion 13G and are received in the recess 114f of the rotatable shaft portion 114a. This structure largely contributes to the size reduction of the electric compressor 10 in the direction of the rotational axis (the XX direction). Furthermore, with this structure, the large components, which generate the heat, can be reliably cooled.

It is desirable that the drive circuit unit 13 is constructed such that the large heat generating devices, which generate the large amount of heat per unit surface area, among the devices of the drive circuit unit 13 have the large projecting amount in the XX direction at the inner side of the stator 112 (the positions of the large heat generating devices are desirably set to be at the right side in FIG. 1).

Second Embodiment

Next, a second embodiment will be described with reference to FIGS. 3 and 4.

The second embodiment differs from the first embodiment with respect to that the protective material layer covers only a portion of the surface of the drive circuit unit. The portions, which are similar to those of the first embodiment, will be indicated by the same reference numerals and will not be described further for the sake of simplicity. The constituent components, which are indicated by the same reference numerals as those of the drawings of the first embodiment, and the other structure, which is not discussed in the second embodiment, are similar to those of the first embodiment and achieve the advantages similar to those of the first embodiment.

Figure 3:
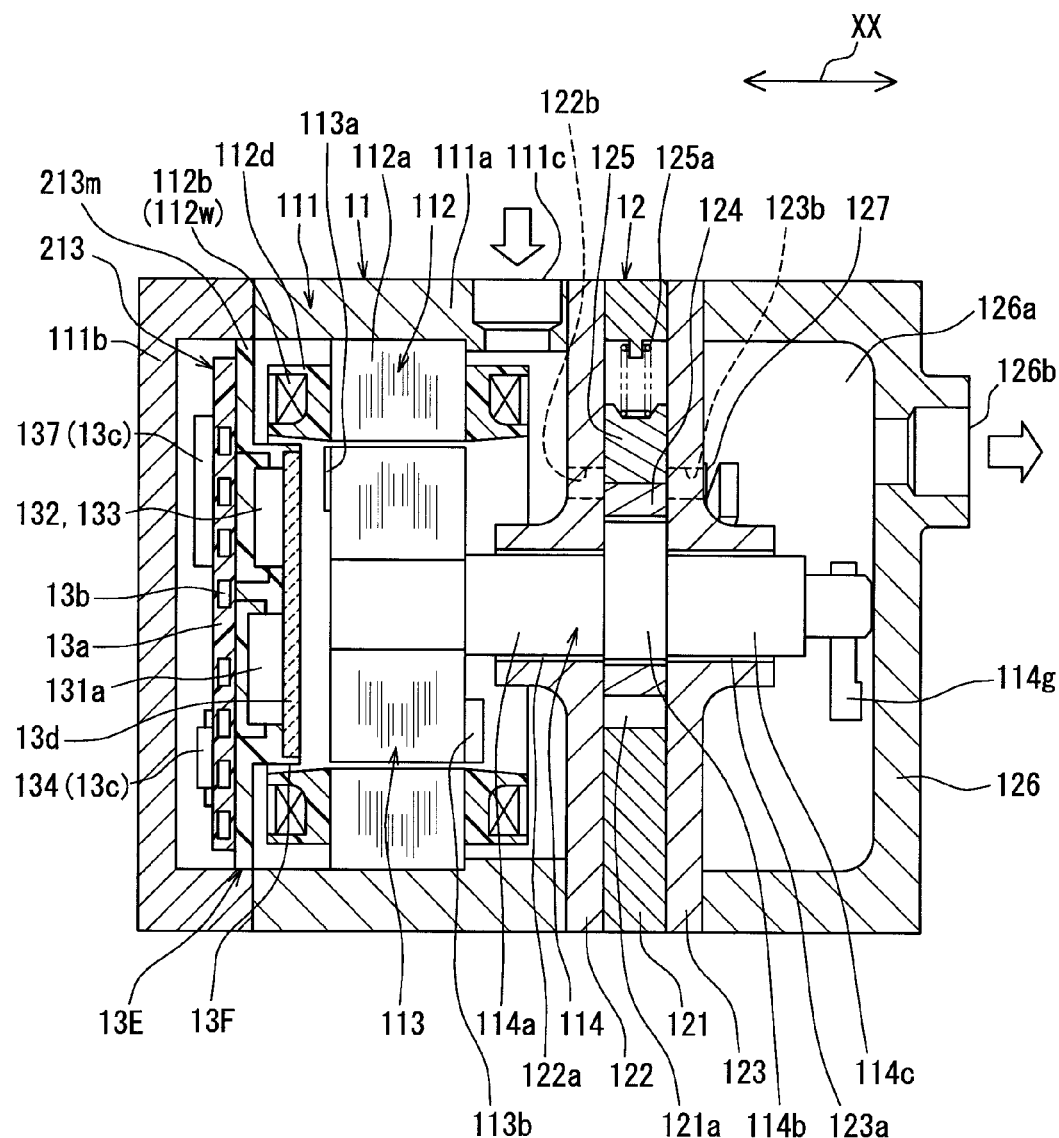
FIG. 3 is a cross-sectional view showing a schematic structure of an electric compressor according to a second embodiment of the present disclosure.

As shown in FIG. 3, in one example of the present embodiment, the drive circuit unit 213 includes the protective member 213m (serving as the protective material layer), which is formed to cover a portion of the surface of the drive circuit unit 213 (specifically, one side surface of the circuit board 13a). The protective member 213m is made of, for example, epoxy resin and is formed by resin molding only at one surface side (the right side surface in the drawing) of the circuit board 13a, to which the devices are installed.

An entire shape of the drive circuit unit 213, in which the protective member 213m is formed, is configured into a stepped cylindrical form, and the drive circuit unit 213 includes the main body portion 13E and the first projecting portion 13F. A seal structure is formed between the outer peripheral surface of the protective member 213m and the inner peripheral surface of the end housing 111b all around the protective member 213m by, for example, a state of pressure contact.

Figure 4:
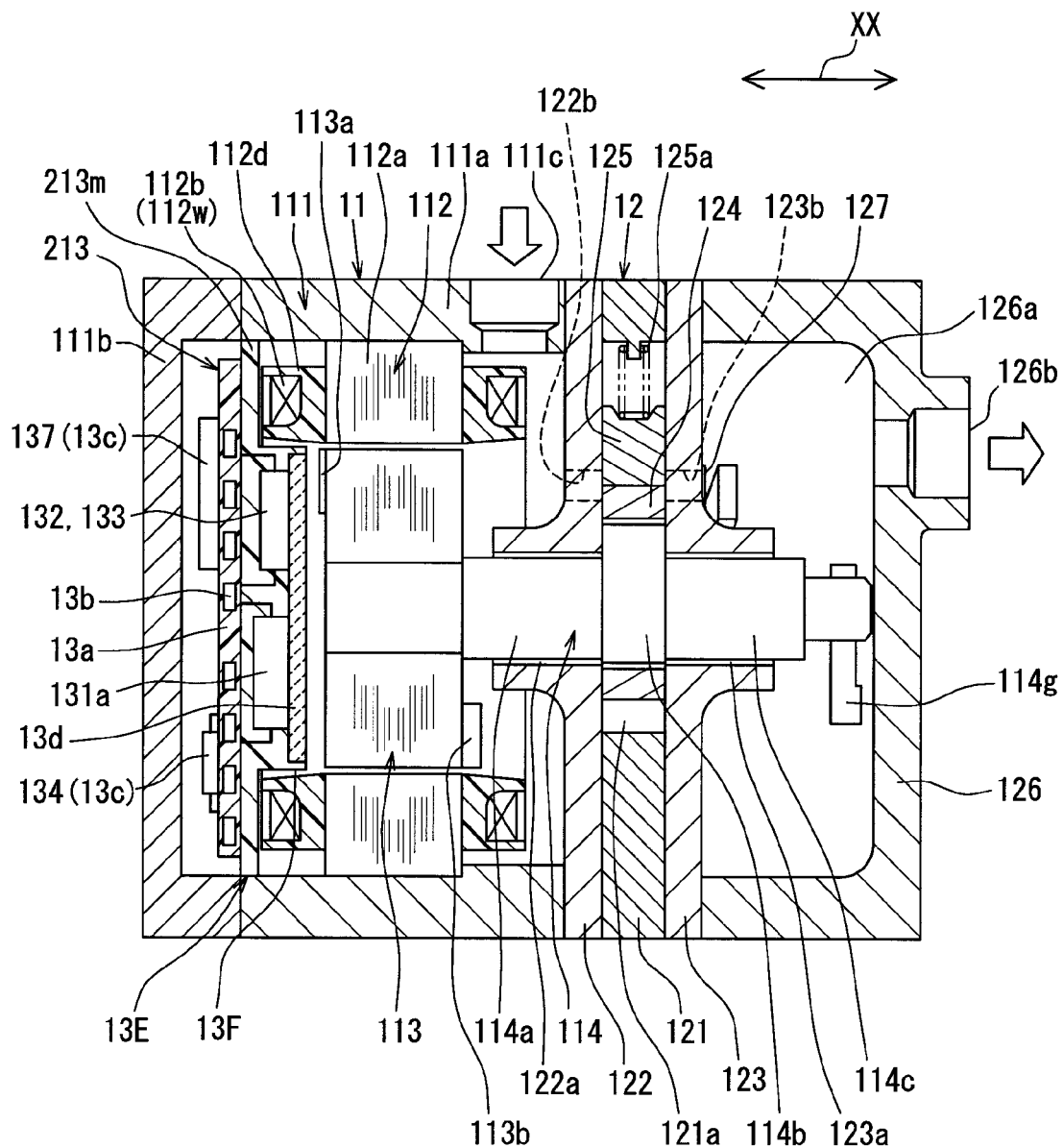
FIG. 4 is a cross-sectional view showing a schematic structure of an electric compressor in a modification of the second embodiment of the present disclosure.

Furthermore, in another example, which is a modification of the above example and is shown in FIG. 4, a seal structure is formed between the outer peripheral surface of the protective member 213m and the inner peripheral surface of the cylindrical tubular portion 111a all around the protective member 213m by, for example, a state of pressure contact.

In the respective electric compressors exemplified in FIGS. 3 and 4, the enlarged diameter part 114d and the recess 114f are not formed in the rotatable shaft portion 114a, and the second projecting portion 13G is not formed in the drive circuit unit 213. However, the present disclosure is not limited to this structure. For example, a structure, which is similar to that of the first embodiment, may be used in these electric compressors.

Even in the present embodiment, the advantages, which are similar to those of the first embodiment, can be achieved. Furthermore, the protective member 213m is formed only in the portion of the drive circuit unit 213, at which the electric circuit needs to be protected from the refrigerant, so that the weight of the drive circuit unit 213 can be reduced.

Third Embodiment

Next, a third embodiment will be described with reference to FIGS. 5 and 6.

In the third embodiment, the configuration of the drive circuit unit is different from that of the first embodiment discussed above. The portions, which are similar to those of the first embodiment, will be indicated by the same reference numerals and will not be described further for the sake of simplicity. The constituent components, which are indicated by the same reference numerals as those of the drawings of the first embodiment, and the other structure, which is not discussed in the third embodiment, are similar to those of the first embodiment and achieve the advantages similar to those of the first embodiment.

Figure 5:
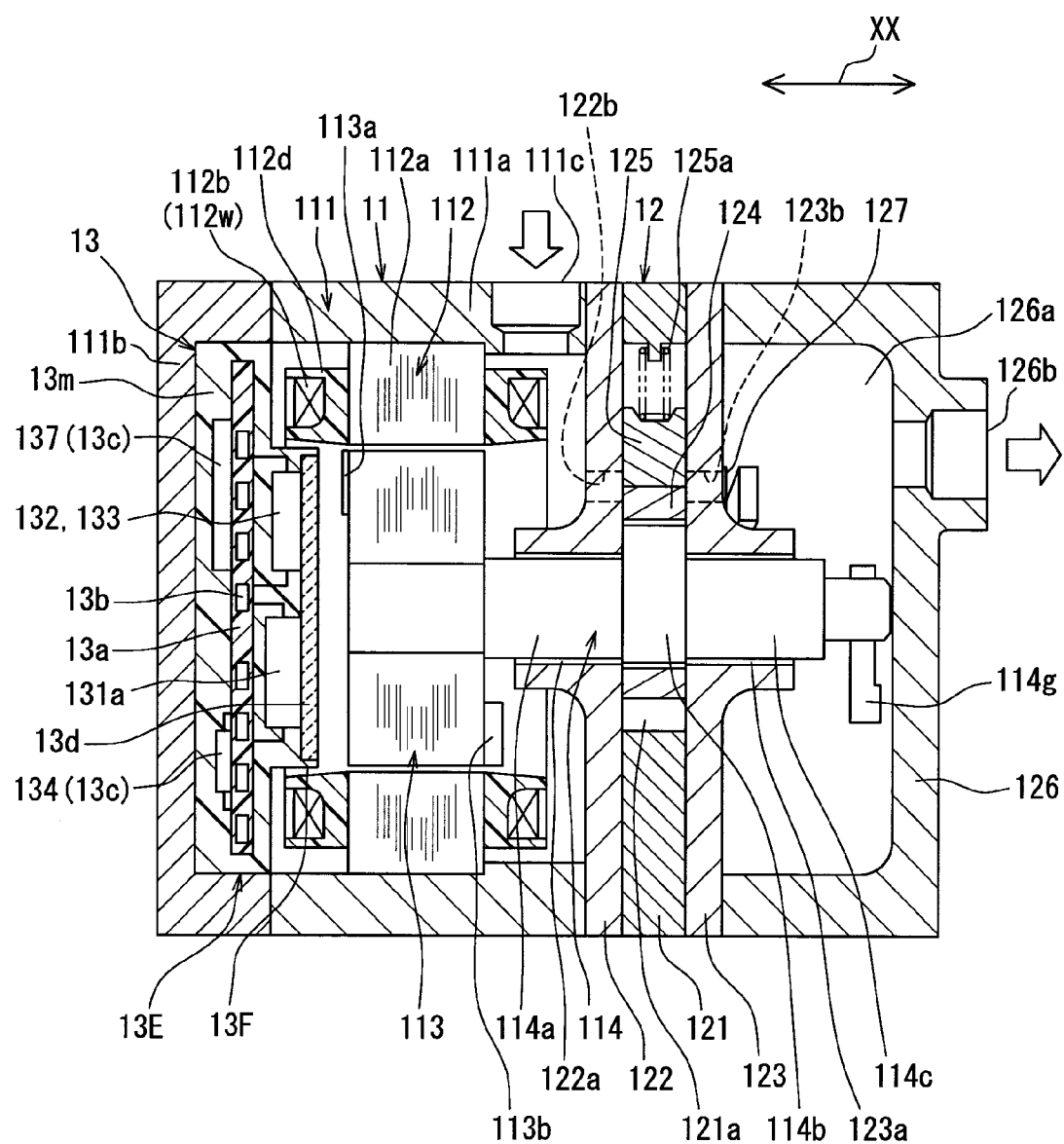
FIG. 5 is a cross-sectional view showing a schematic structure of an electric compressor according to a third embodiment of the present disclosure.

As shown in FIG. 5, an entire shape of the drive circuit unit 13 is configured into a stepped cylindrical form, and the drive circuit unit 213 includes the main body portion 13E and the first projecting portion 13F. The main body portion 13E is placed in the recess of the end housing 111b, and the drive circuit unit 13 is supported by the end housing 111b.

Figure 6:
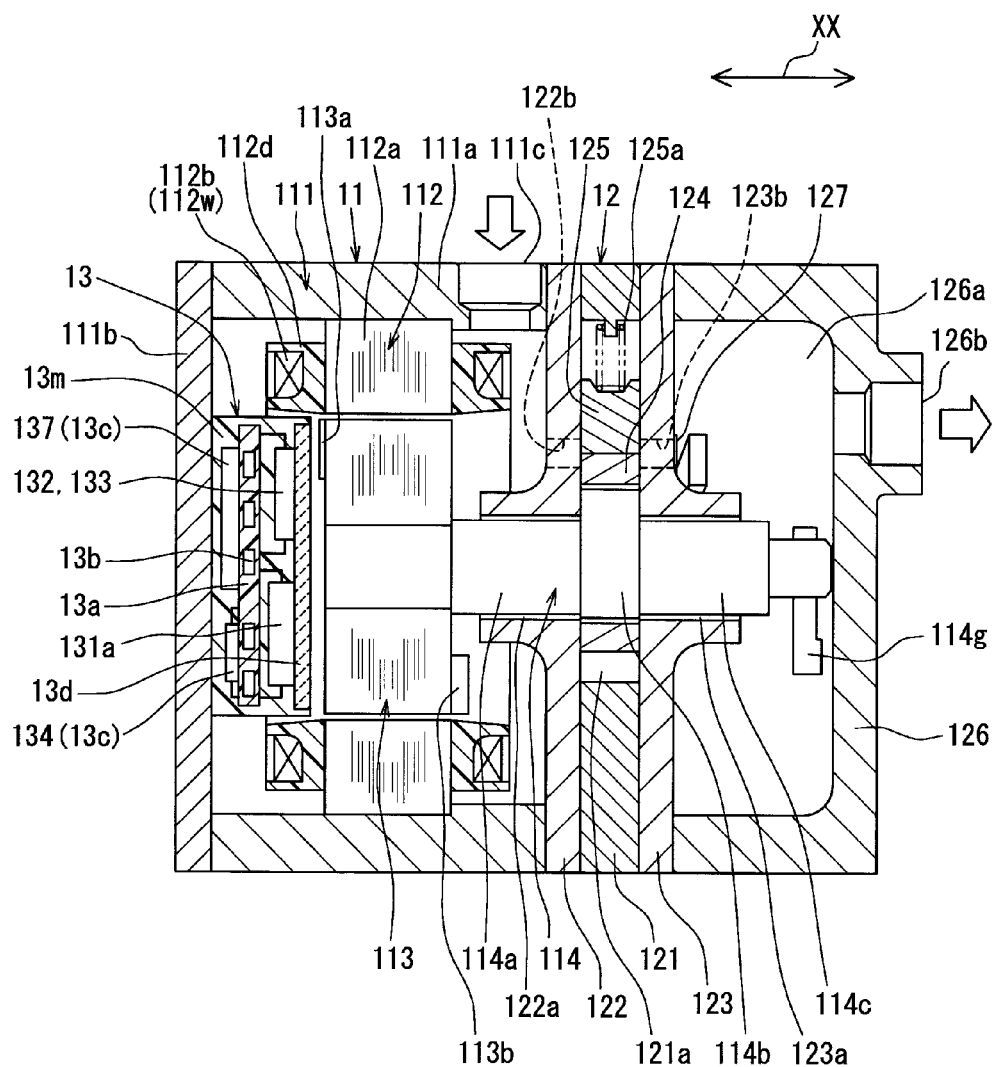
FIG. 6 is a cross-sectional view showing a schematic structure of an electric compressor in a modification of the third embodiment of the present disclosure.

Furthermore, in another example, which is a modification of the above example and is shown in FIG. 6, an entire shape of the drive circuit unit 13 is configured into a cylindrical form, in which a stepped portion is not formed. The drive circuit unit 13 of this example is securely held by a right side surface of the end housing 111*b* and is thereby supported by the end housing 111*b*. In a view taken in the XX direction, the drive circuit unit 13 is entirely placed at the inner side of the inner peripheral part of the stator 112 in the radial direction.

In the electric compressor exemplified in FIG. 5, the enlarged diameter part 114*d* and the recess 114*f* are not formed in the rotatable shaft portion 114*a*, and the second projecting portion 13G is not formed in the drive circuit unit 13. However, the present disclosure is not limited to this structure. For example, a structure, which is similar to that of the first embodiment, may be used in this electric compressor. In the electric compressor exemplified in FIG. 6, the enlarged diameter part 114*d* and the recess 114*f* are not formed in the rotatable shaft portion 114*a*, and the first and second projecting portions 13F, 13G are not formed in the drive circuit unit 13. However, the present disclosure is not limited to this structure. For example, a structure, which is similar to that of the first embodiment, may be used in this electric compressor.

Even in the present embodiment, the advantages, which are similar to those of the first embodiment, can be achieved.

Fourth Embodiment

Next, a fourth embodiment will be described with reference to FIGS. 7 and 8.

The fourth embodiment differs from the third embodiment with respect to that a connecting structure between the stator coils and the drive circuit unit is described in the fourth embodiment. The portions, which are similar to those of the first and third embodiments, will be indicated by the same reference numerals and will not be described further for the sake of simplicity. The constituent components, which are indicated by the same reference numerals as those of the drawings of the first and third embodiments, and the other structure, which is not discussed in the fourth embodiment, are similar to those of the first and third embodiments and achieve the advantages similar to those of the first and third embodiments.

Figure 7:
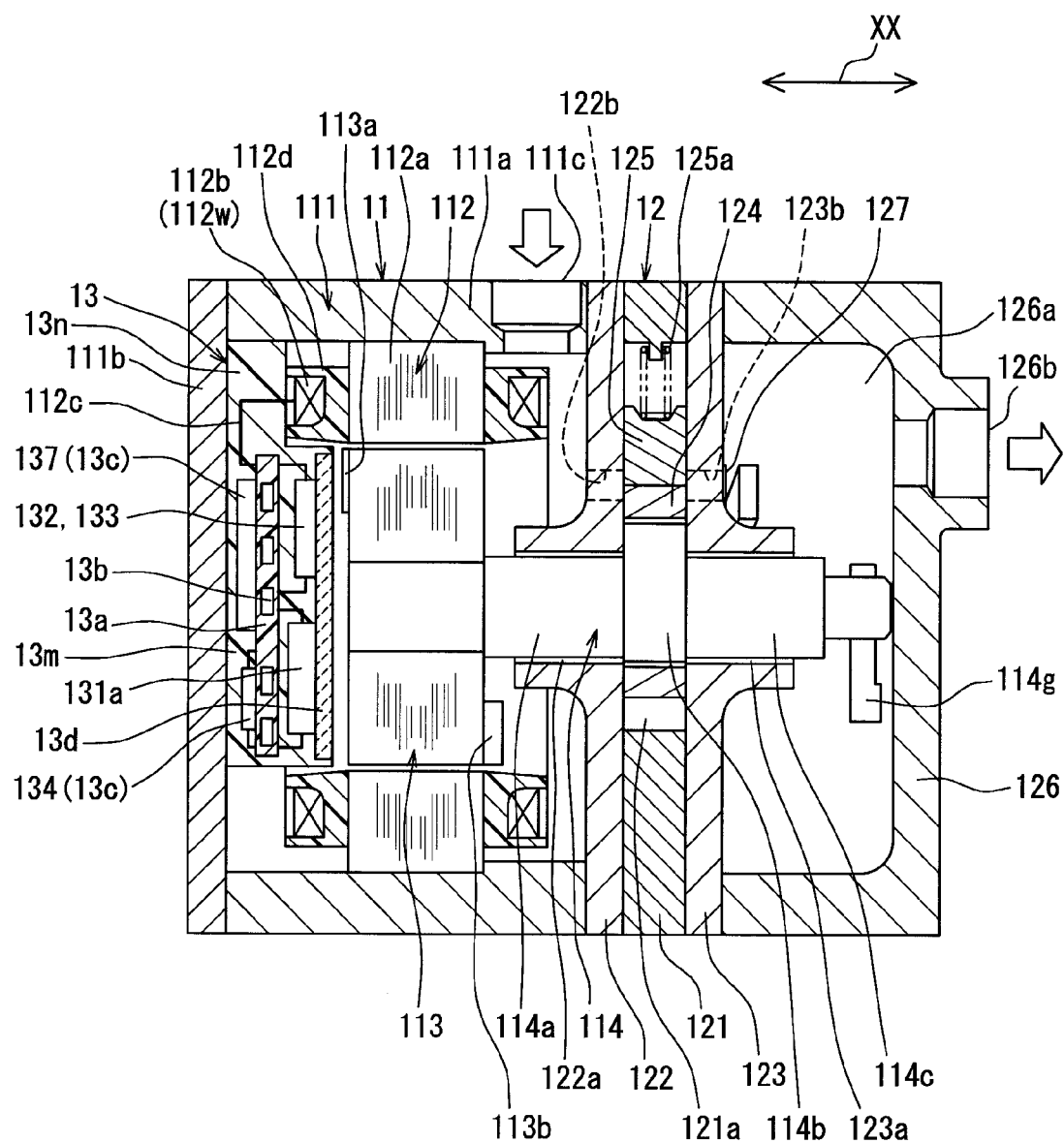
FIG. 7 is a cross-sectional view showing a schematic structure of an electric compressor according to a fourth embodiment of the present disclosure.

As shown in FIG. 7, in one example of the present embodiment, the protective member 13*m* of the drive circuit unit 13 projects upwardly in the drawing unlike the electric compressor exemplified in FIG. 6 of the third embodiment, and the bobbin 112*d* contacts a right side surface of this projecting portion 13*n* in the drawing. The projecting portion 13*n* is placed in an area where a shade of the stator 112 is projected in the XX direction.

Extensions 112*c* of the electrically conductive wire(s) 112*w* of the coils 112*b* wound around the bobbin 112*d* are pulled out from the coils 112*b* wound around the bobbin 112*d*. The extensions 112*c*, which extend from the coils 112*b*, extend to an inside of the projecting portion 13*n* and are connected to the corresponding conductor pattern of the drive circuit unit 13. The extensions 112*c* of the electrically conductive wire(s) 112*w* correspond to the output lines 135 shown in FIG. 2.

Figure 8:
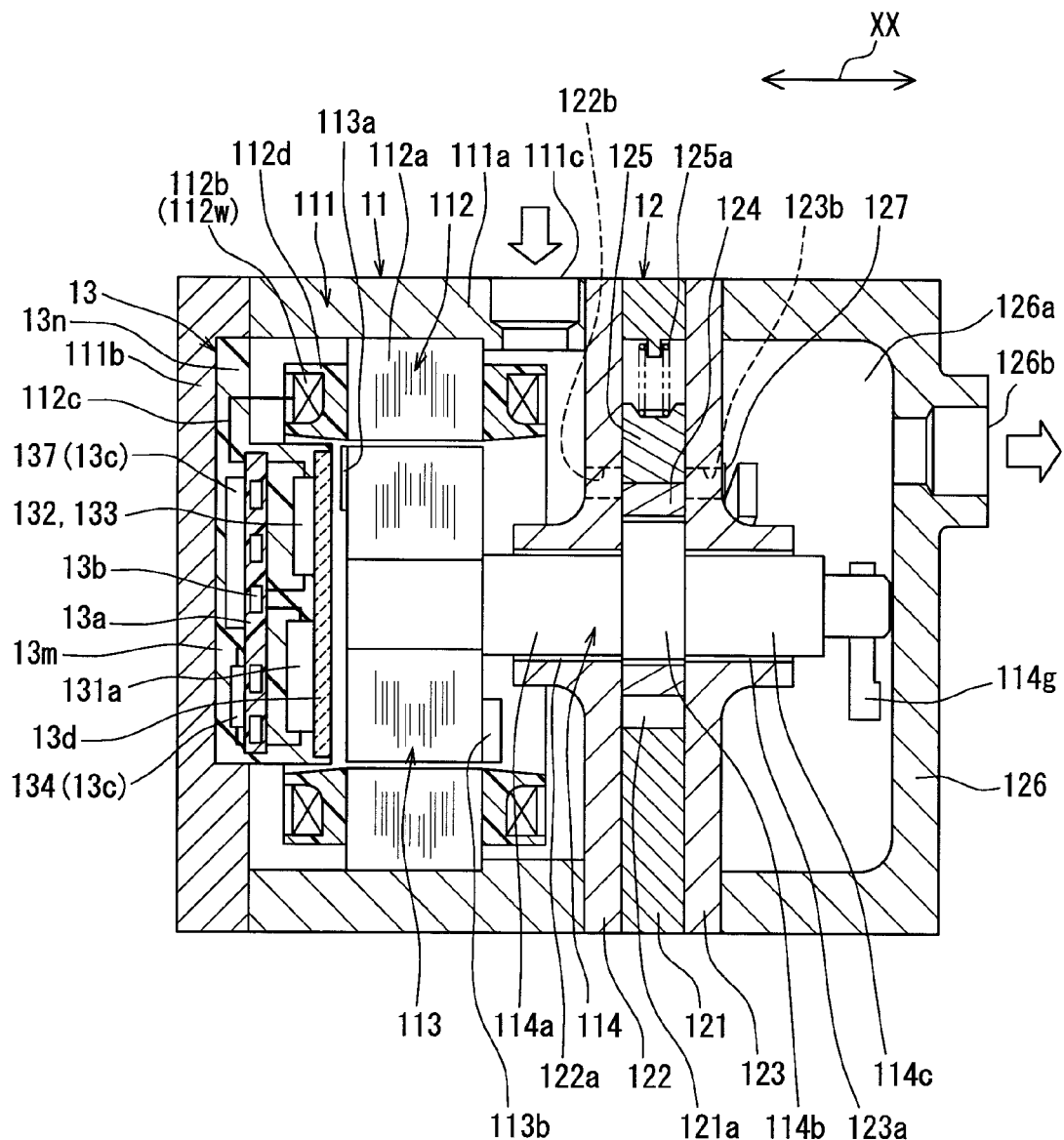
FIG. 8 is a cross-sectional view showing a schematic structure of an electric compressor in a modification of the fourth embodiment of the present disclosure.

Furthermore, in another example, which is a modification of the above example and is shown in FIG. 8, there is shown an example where the drive circuit unit 13, which includes the projecting portion 13*n*, is received in the recess of the end housing 111*b*. In the example shown in FIG. 8, the bobbin 112*d* does not contact the projecting portion 13*n*. However, the example of FIG. 8 may be further modified such that the bobbin 112*d* contacts the projecting portion 13*n*.

In the respective electric compressors exemplified in FIGS. 7 and 8, the enlarged diameter part 114*d* and the recess 114*f* are not formed in the rotatable shaft portion 114*a*, and the second projecting portion 13G is not formed in the drive circuit unit 13. However, the present disclosure is not limited to this structure. For example, a structure, which is similar to that of the first embodiment, may be used in this electric compressor.

Even in the present embodiment, the advantages, which are similar to those of the first embodiment, can be achieved.

Furthermore, the stator 112 includes the core 112*a* and the coils 112*b*, and the coils 112*b* are made of the electrically conductive wire(s) 112*w* and are wound around the core 112*a*. Each of the extensions 112*c* of the electrically conductive wire(s) 112*w* extends from the corresponding one of the coils 112*b* to the inside of the protective member 13*m* and electrically connects between the drive circuit unit 13 and the corresponding one of the coils 112*b*.

In this way, the electrical connection between the drive circuit unit 13 and each one of the coils 112*b* can be made without using a connector. Thus, the size of the electric compressor can be further reliably reduced.

Fifth Embodiment

Next, a fifth embodiment will be described with reference to FIGS. 9 and 10.

The fifth embodiment differs from the first embodiment with respect to that the compressor unit has a multistage compression mechanism in the fifth embodiment. The portions, which are similar to those of the first embodiment, will be indicated by the same reference numerals and will not be described further for the sake of simplicity.

The constituent components, which are indicated by the same reference numerals as those of the drawings of the first embodiment, and the other structure, which is not discussed in the fifth embodiment, are similar to those of the first embodiment and achieve the advantages similar to those of the first embodiment.

Figure 9:
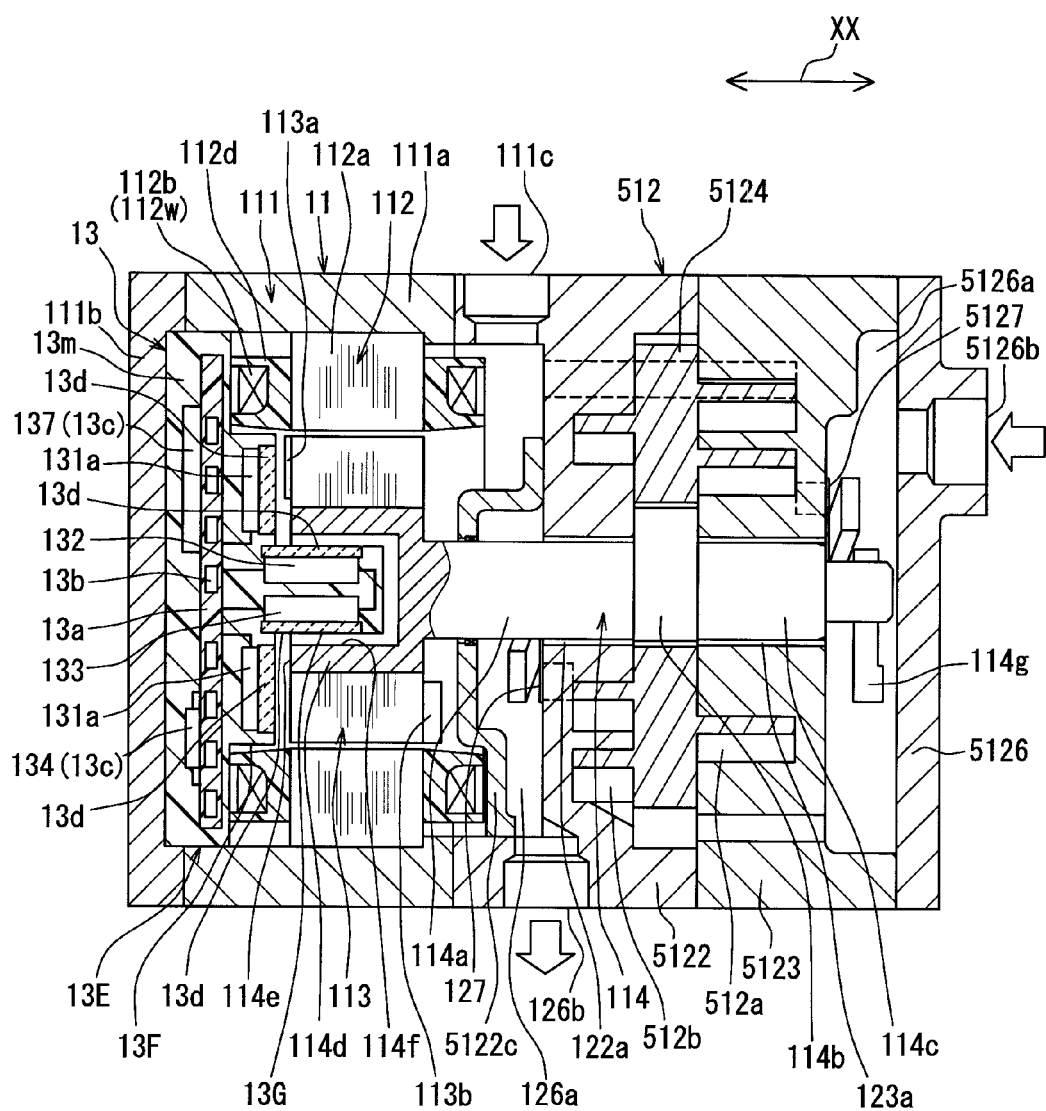
FIG. 9 is a cross-sectional view showing a schematic structure of an electric compressor according to a fifth embodiment of the present disclosure.

As shown in FIG. 9, the compressor unit 512 of one example of the present embodiment has a two-stage compression mechanism that includes two rotational compression mechanisms of a scroll type. In the compressor unit 512, a low-stage compression chamber 512*a* is formed between the rotor 5124 and the support plate 5123, and a high-stage compression chamber (serving as a final stage compression chamber) 512*b* is formed between the rotor 5124 and the support plate 5122.

An intermediate-pressure chamber 5126*a* is formed between the support plate 5123 and the front housing 5126, and the refrigerant, which is compressed in the low-stage compression chamber 512*a* is discharged into the intermediate-pressure chamber 5126*a*. A low-stage discharge valve 5127 is installed to the intermediate-pressure chamber 5126*a*. The low-stage discharge valve 5127 opens a low-stage discharge hole communicated to the intermediate-pressure chamber 5126*a* when the pressure of the low-stage compression chamber 512*a* reaches a predetermined intermediate pressure. The low-stage discharge valve 5127 includes, for example, a reed valve and a retainer. The retainer limits excessive displacement of the reed valve and holds the reed valve.

An intermediate-pressure suction port 5126*b* is formed in the front housing 5126 to guide the injection refrigerant of the intermediate pressure to the intermediate-pressure chamber 5126a. A partition member 5122c, which is joined to the support plate 5122, is placed in the inside of the motor housing 111. A space between the support plate 5122 and the partition member 5122c forms a discharge chamber 126a. The discharge valve 127, which is placed in the discharge chamber 126a, is a high-stage discharge valve.

In the compressor unit 512, the low-pressure refrigerant, which is received from the evaporator of the refrigeration cycle, is supplied into the inside of the motor housing 111 through the suction port 111c and is compressed to the intermediate pressure in the low-stage compression chamber 512a. Thereafter, the refrigerant is discharged from the low-stage compression chamber 512a to the intermediate-pressure chamber 5126a. In the intermediate-pressure chamber 5126a, the refrigerant, which is discharged from the low-stage compression chamber 512a to the intermediate-pressure chamber 5126a, is merged with the injection refrigerant, which is supplied from the refrigeration cycle through the intermediate-pressure suction port 5126b. The intermediate-pressure refrigerant is compressed to the high pressure in the high-stage compression chamber 512b and is thereafter discharged to the discharge chamber 126a. The high pressure refrigerant of the discharge chamber 126a is discharged to the radiator of the refrigeration cycle through the discharged port 126b.

In the electric compressor shown in FIG. 9, the drive circuit unit 13 is placed in a corresponding location where the refrigerant flows before the refrigerant is compressed in the high-stage compression chamber 512b as well as before the refrigerant is compressed in the low-stage compression chamber 512a.

Figure 10:
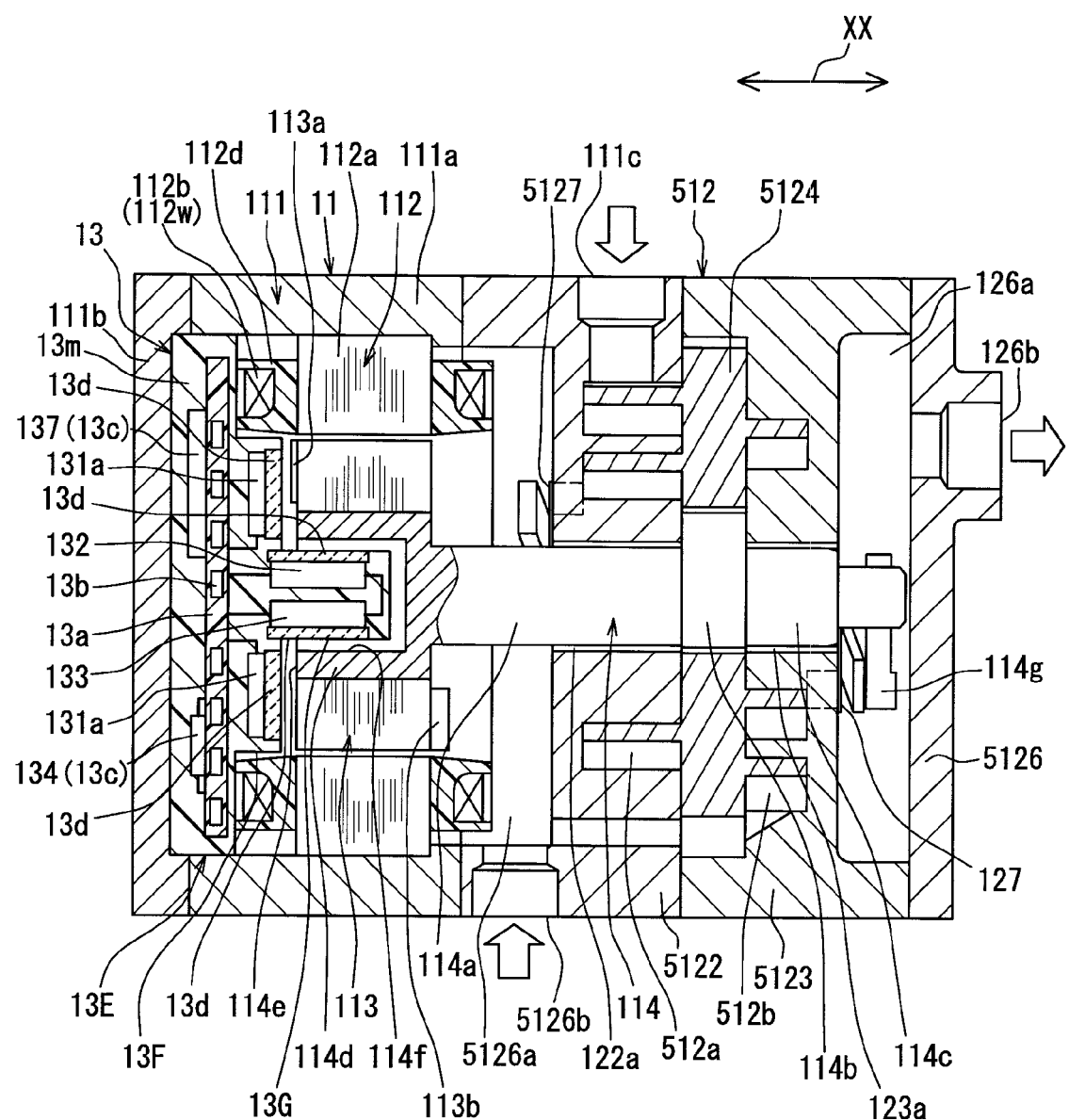
FIG. 10 is a cross-sectional view showing a schematic structure of an electric compressor in a modification of the fifth embodiment of the present disclosure.

Furthermore, in another example, which is a modification of the above example and is shown in FIG. 10, the positional relationship between the low-stage compression chamber 512a and the high-stage compression chamber 512b is reversed with respect to the positional relationship between the low-stage compression chamber 512a and the high-stage compression chamber 512b in the compressor unit exemplified in FIG. 9. The inside space of the motor housing 111 forms the intermediate-pressure chamber 5126a, and the space between the support plate 5123 and the front housing 5126 forms the discharge chamber 126a.

In the electric compression shown in FIG. 10, the drive circuit unit 13 is placed at a corresponding location where the intermediate-pressure refrigerant flows before the intermediate-pressure refrigerant is compressed in the high-stage compression chamber 512b.

Even in the present embodiment, the advantages, which are similar to those of the first embodiment, can be achieved.

The compressor unit 512 forms the two-stage compression mechanism that increases the pressure of the refrigerant step-by-step through the two compression chambers 512a, 512b. The drive circuit unit 13 is placed at a corresponding location where the refrigerant flows before the refrigerant is drawn into the high-stage compression chamber 512b of the final stage.

The refrigerant, which is not yet drawn into the high-stage compression chamber 512b of the final stage, has a lower temperature and a lower pressure in comparison to the discharged refrigerant that is discharged from the compressor unit 512. Thereby, in the respective examples of the present embodiment, the drive circuit unit 13 can be cooled with the drawn refrigerant or the intermediate-pressure refrigerant, which has the lower temperature and the lower pressure in comparison to the discharged refrigerant.

The compressor unit 512 of the above two examples has the two-stage compression mechanism. However, the present disclosure is not limited to this structure. That is, the compressor unit 512 may have a compression mechanism of three or more stages Specifically, the compressor unit forms the multistage compression mechanism, which increases the pressure of the refrigerant step-by-step through the multiple compression chambers, and it is only required that the drive circuit unit is placed at the corresponding location where the refrigerant flows before the refrigerant is drawn into the final one, i.e., the final-stage compression chamber among the multiple compression chambers.

The refrigerant, which is not yet drawn into the final-stage compression chamber of the multistage compression mechanism, is the drawn refrigerant, which is drawn into the compressor unit, or the intermediate-pressure refrigerant, which has the intermediate-pressure that is higher than the pressure of the drawn refrigerant and is lower than the pressure of the discharged refrigerant that is discharged from the compressor unit. Therefore, the refrigerant, which is not yet drawn into the final-stage compression chamber, has the lower temperature and the lower pressure in comparison to the discharged refrigerant, which is discharged from the compressor unit. Thereby, the drive circuit unit can be cooled with the drawn refrigerant or the intermediate-pressure refrigerant, which has the lower temperature and the lower pressure in comparison to the discharged refrigerant.

The compressor unit 512 of the present embodiment has the rotational compression mechanism of the scroll type. However, the compression mechanism of the present disclosure is not limited to the rotational compression mechanism of the scroll type. For example, the compression mechanism of the present disclosure may be a rotational compression mechanism, in which an eccentric rotor is rotated, or a compression mechanism of a reciprocating type.

Other Embodiments

The preferred embodiments of the present disclosure have been described. However, the present disclosure is not limited to the above embodiments. The above embodiments may be modified in various ways without departing from the scope of the present disclosure.

In each of the above embodiments, the drive circuit unit is placed at the inner side of the stator 112 such that the portion of the drive circuit unit overlaps with the stator 112 in the XX direction. Alternatively, the drive circuit unit may be placed at the inner side of the stator 112 such that the entire drive circuit unit overlaps with the stator 112 in the XX direction. In other words, the drive circuit unit may be placed at the inner side of the stator 112 in the radial direction such that at least a portion of the axial extent of the drive circuit unit measured in the direction of the rotational axis is included in the axial extent of the stator 112 measured in the direction of the rotational axis. Alternatively, the drive circuit unit may be placed at the inner side of the stator 112 in the radial direction such that the entire axial extent of the drive circuit unit measured in the direction of the rotational axis is included in the axial extent of the stator 112 measured in the direction of the rotational axis.

Furthermore, in each of the above embodiments, the rotatable shaft portion 114a, which is rotated integrally with the rotor 113 of the motor unit 11, has a single side support structure where only the one end side of the rotatable shaft portion 114a, at which the compressor unit 12 is placed, is rotatably supported. For example, the rotatable shaft portion may have a two-side support structure where the two sides of the rotatable shaft portion, between which the fixing part of the rotatable shaft portion for fixing the rotor is located, may be rotatably supported by bearing portions, respectively.

Furthermore, in each of the above embodiments, the protective material layer, which is formed at the surface of the drive circuit unit, is the protective member made of the molded resin. However, the present disclosure is not limited to this one. For example, the protective material layer may be formed by potting or coating.

Furthermore, in each of the above embodiments, the suction port 111c, through which the refrigerant is drawn into the inside of the motor housing 111, is formed at the location adjacent to the compressor unit. However, the present disclosure is not limited to this structure. For example, the suction port may be formed at another location of the motor housing 111, which is located on a side of the stator 112 that is opposite from the compressor unit, to more actively pass the refrigerant in the XX direction between the stator 112 and the rotor 113.

Furthermore, in each of the above embodiments, the drawn refrigerant is passed in the inside of the motor housing 111. However, the present disclosure is not limited to this structure. For example, there may be implemented a structure where the refrigerant passage is not formed in the inside of the motor housing.

The invention claimed is:

1. An electric compressor comprising:
   a compressor unit that draws and compresses refrigerant;
   an electric motor that drives the compressor unit;
   a motor housing that receives the electric motor in an inside of the motor housing and conducts the refrigerant to be drawn into the compressor unit through the inside of the motor housing; and
   a drive circuit unit that drives the electric motor, wherein:
   the electric motor includes:
      a stator that generates a rotating magnetic field; and
      a rotor that is rotated about a rotational axis by the rotating magnetic field at a radially inner side of the stator;
   the drive circuit unit is placed at the radially inner side of the stator such that a position of the drive circuit unit in a direction of the rotational axis overlaps with the stator;
   the electric motor includes a rotatable shaft portion, to which the rotor is fixed, wherein the rotatable shaft portion rotates about the rotational axis;
   the compressor unit is engaged with one of two end sides of the rotatable shaft portion, which are placed along the direction of the rotational axis on two opposite sides, respectively, of a fixing part of the rotatable shaft portion where the rotor is fixed to the rotatable shaft portion;
   the drive circuit unit is placed at the other one of the two end sides of the rotatable shaft portion;
   the drive circuit unit is placed in the inside of the motor housing;
   a protective material layer, which isolates and protects an electric circuit of the drive circuit unit from the refrigerant, is formed on a surface of the drive circuit unit;
   a recess, which is recessed from an end surface of the rotatable shaft portion at the other one of the two end sides of the rotatable shaft portion, is formed in the rotatable shaft portion; and
   a portion of the drive circuit unit is received in an inside of the recess.

2. The electric compressor according to claim 1, wherein:
   the stator includes:
      a core; and
      at least one coil that is made of an electrically conductive wire, which is wound around the core; and
   a plurality of extensions of the electrically conductive wire extends from the at least one coil into an inside of the protective material layer to electrically connect between the drive circuit unit and the at least one coil through the plurality of extensions.

3. The electric compressor according to claim 1, wherein:
   the compressor unit forms a multistage compression mechanism that increases a pressure of the refrigerant step-by-step through a plurality of compression chambers; and
   the drive circuit unit is placed at a location where the refrigerant flows before the refrigerant is drawn into a final one of the plurality of compression chambers.

4. The electric compressor according to claim 1, wherein the rotatable shaft portion is rotatably supported only on one axial side of a core of the stator, at which the compressor unit is located.

5. The electric compressor according to claim 1, wherein only one of the two end sides of the rotatable shaft portion is fixed.

6. An electric compressor comprising:
   a compressor unit that draws and compresses refrigerant;
   an electric motor that drives the compressor unit; and
   a drive circuit unit that drives the electric motor, wherein:
   the electric motor includes:
      a stator that generates a rotating magnetic field; and
      a rotor that is rotated about a rotational axis by the rotating magnetic field at a radially inner side of the stator;
   the drive circuit unit is placed at the radially inner side of the stator such that a position of the drive circuit unit in a direction of the rotational axis overlaps with the stator;
   the electric motor includes a rotatable shaft portion having two end sides, to which the rotor is fixed, wherein the rotatable shaft portion rotates about the rotational axis;
   a recess, which is recessed from an end surface of the rotatable shaft portion at one of the two end sides of the rotatable shaft portion, is formed in the rotatable shaft portion; and
   a portion of the drive circuit unit is received in an inside of the recess.

7. The electric compressor according to claim 6, wherein the rotatable shaft portion is rotatably supported only on one axial side of a core of the stator, at which the compressor unit is located.

8. The electric compressor according to claim 6, wherein only one of the two end sides of the rotatable shaft portion is fixed.

* * * * *